US010108001B2

(12) United States Patent
Spencer

(10) Patent No.: US 10,108,001 B2
(45) Date of Patent: Oct. 23, 2018

(54) REFLECTIVE TELESCOPE WITH WIDE FIELD OF VIEW

(71) Applicant: DRS Network & Imaging Systems, LLC, Melbourne, FL (US)

(72) Inventor: Harvey M. Spencer, Rolling Hills Estates, CA (US)

(73) Assignee: DRS Network & Imaging Systems, LLC, Melbourne, FL (US)

( * ) Notice: Subject to any disclaimer, the term of this patent is extended or adjusted under 35 U.S.C. 154(b) by 304 days.

(21) Appl. No.: 15/081,761

(22) Filed: Mar. 25, 2016

(65) Prior Publication Data

US 2016/0282600 A1 Sep. 29, 2016

Related U.S. Application Data

(60) Provisional application No. 62/139,484, filed on Mar. 27, 2015.

(51) Int. Cl.
*G02B 17/02* (2006.01)
*G02B 23/06* (2006.01)
*G02B 17/06* (2006.01)

(52) U.S. Cl.
CPC ......... *G02B 23/06* (2013.01); *G02B 17/0663* (2013.01)

(58) Field of Classification Search
CPC . G02B 5/08; G02B 5/10; G02B 17/00; G02B 17/02; G02B 17/06; G02B 17/0605;
(Continued)

(56) References Cited

U.S. PATENT DOCUMENTS 4,101,195 A * 7/1978 Frosch ............... G02B 17/0631
359/366
6,333,811 B1 12/2001 Tatian et al.
(Continued)

FOREIGN PATENT DOCUMENTS

JP 2014-174212 A 9/2014
WO WO 2010028748 3/2010
WO WO 2016160625 10/2016

OTHER PUBLICATIONS

PCT/US2016/024369, International Search Report and Written Opinion, dated Jun. 10, 2016, 11 pages.
(Continued)

*Primary Examiner* — Arnel C Lavarias
(74) *Attorney, Agent, or Firm* — Kilpatrick Townsend & Stockton LLP

(57) ABSTRACT

Systems and methods for providing a wider FOV for a telescope system are disclosed. In one embodiment, a telescope includes a primary mirror having an orifice, where an optical path originates from an object positioned in front of the primary mirror and reflects off the primary mirror. A secondary mirror is disposed adjacent to the primary mirror, where the optical path reflects off the secondary mirror and passes through the orifice in the primary mirror. The telescope includes a set of extended field corrector optics disposed along the optical path, the extended field corrector optics positioned to reflect light incident from the secondary mirror, where the set of extended field corrector optics includes two corrector mirrors. A tertiary mirror is disposed along the optical path and adjacent to the extended field corrector optics, the tertiary mirror positioned to reflect the light incident from the extended field corrector optics.

20 Claims, 9 Drawing Sheets

(58) Field of Classification Search
CPC .............. G02B 17/061; G02B 17/0626; G02B 17/0631; G02B 17/0647; G02B 17/0652; G02B 23/00; G02B 23/02
USPC ....... 359/362, 363, 364, 365, 366, 399, 400, 359/423, 431, 434, 838, 850, 857, 858, 359/859, 861, 864
See application file for complete search history.

(56) References Cited

U.S. PATENT DOCUMENTS

| | | |
|---|---|---|
| 8,123,371 B2 | 2/2012 | Cook et al. |
| 8,427,744 B2 | 4/2013 | Cook et al. |
| 8,534,851 B2 | 9/2013 | Spencer et al. |
| 8,873,122 B2 | 10/2014 | Mann et al. |
| 2013/0114156 A1 | 5/2013 | Cook et al. |
| 2014/0254003 A1* | 9/2014 | Katashiba .............. G02B 23/06 359/366 |

OTHER PUBLICATIONS

Korean Office Action dated Apr. 26, 2018 for KR Patent Application No. 10-2017-7031096, including English Summary, 8 pages.

* cited by examiner

REFLECTIVE TELESCOPE WITH WIDE FIELD OF VIEW

CROSS-REFERENCES TO RELATED APPLICATIONS

This application claims priority to U.S. Provisional Patent Application No. 62/139,484, filed on Mar. 27, 2015, entitled "Reflective Telescope with Wide Field of View," the disclosure of which is hereby incorporated by reference in its entirety for all purposes.

BACKGROUND OF THE INVENTION

Space-based telescopes are utilized by a variety of industries, such as the defense industry and the commercial space industry. Space-based telescopes orbit around the Earth as they observe and/or measure the Earth's surface.

Despite the progress made in space-based telescopes, there is a need in the art for improved methods and systems related to telescopes with a wide field of view.

SUMMARY OF THE INVENTION

The present disclosure relates in general to space-based imaging systems, and in particular to space-based telescope systems having a wide field of view (FOV). The invention has wider applicability and is also applicable to terrestrial-based imaging systems and telescopes.

Embodiments of the present invention relate to systems and methods that provide a wider FOV for a telescope system. In an embodiment, the system includes an afocal telescope that has a plurality of mirrors. The plurality of mirrors includes a set of field corrector optics, whose purpose is to reduce optical aberrations to an extent necessary to permit achieving a wide field of view, that are positioned to reflect light incident from a secondary mirror. The incident light may pass through an orifice in a primary mirror before being reflected by the set of extended field corrector optics. The invention has wide applicability to commercial space systems, as well as military surveillance systems, both space-based and terrestrial-based.

According to an embodiment of the present invention, a telescope includes a primary mirror having an orifice, where an optical path originates from an object positioned in front of the primary mirror and reflects off the primary mirror. A secondary mirror may be disposed adjacent to the primary mirror, where the optical path reflects off the secondary mirror and passes through the orifice in the primary mirror. The telescope includes a set of extended field corrector optics disposed along the optical path, the extended field corrector optics positioned to reflect light incident from the secondary mirror, where the set of extended field corrector optics comprises two corrector mirrors. The telescope further includes a tertiary mirror disposed along the optical path and adjacent to the extended field corrector optics.

In an embodiment, the tertiary mirror is characterized by an optical power suitable to collimate light received from the set of extended field corrector optics. Alternatively, in an embodiment, the tertiary mirror is characterized by an optical power sufficient to focus light incident from the set of extended field corrector optics onto a detector. In certain embodiments, the tertiary mirror is positioned to receive light incident from the set of extended field corrector optics that is propagating toward the primary mirror. The tertiary mirror may be positioned adjacent to the primary mirror. In some embodiments, the telescope further includes a fold mirror disposed along the optical path and adjacent to the extended field corrector optics, the fold mirror may be positioned to reflect an optical path from the tertiary mirror. In some embodiments, the extended field corrector optics includes a convex mirror and a concave mirror. The extended field corrector optics may have substantially no net optical power. In an embodiment, the convex mirror and the concave mirror are disposed on opposite sides of an intermediate image. The intermediate image may be disposed equal distances away from the convex mirror and the concave mirror. In embodiments, the intermediate image is an accessible intermediate image.

In some embodiments, the two corrector mirrors are both aspheric. The convex mirror may be more aspheric than the concave mirror. In an embodiment, the convex mirror departs by up to 25 waves from a sphere and the concave mirror departs by up to 15 waves from a sphere. In some embodiments, each corrector mirror is rotationally symmetric. In some embodiments, the fold mirror and tertiary mirror are on opposite sides of the set of extended field corrector optics. In embodiments, the primary mirror has a center, and the orifice is offset from the center.

According to another embodiment of the present invention, a method of correcting an optical field includes reflecting, by a primary mirror, light originating from an object toward a secondary mirror, and reflecting, by the secondary mirror, the light from the primary mirror toward a set of extended field corrector optics, where the light passes through an orifice in the primary mirror. The method includes reflecting, by the set of extended field corrector optics, the light from the secondary mirror toward a tertiary mirror, and reflecting, by the tertiary mirror, the light from the extended field corrector optics toward a fold mirror.

In embodiments, the set of extended field corrector optics reflects the light twice. In some embodiments, an intermediary image is created after the first reflection.

According to yet another embodiment of the present invention, a telescope system includes a plurality of mirrors and a detector positioned to receive light incident from the plurality of mirrors. The plurality of mirrors may include a primary mirror having an orifice, where an optical path originates from an object in front of the primary mirror and reflects off the primary mirror. A secondary mirror is disposed adjacent to the primary mirror, where the optical path reflects off the secondary mirror and passes through the orifice in the primary mirror. The plurality of mirrors includes a set of extended field corrector optics disposed along the optical path, the extended field corrector optics positioned to reflect light incident from the secondary mirror, where the set of extended field corrector optics comprises two corrector mirrors. The plurality of mirrors further includes a tertiary mirror disposed along the optical path and adjacent to the extended field corrector optics, the tertiary mirror positioned to reflect the light incident from the extended field corrector optics. An additional set of mirrors or lenses may then be included to focus light onto a detector.

In some embodiments, the plurality of fold mirrors further includes a fold mirror disposed along the optical path and adjacent to the extended field corrector optics, the fold mirror positioned to reflect an optical path from the tertiary mirror. In some embodiments, the extended field corrector optics comprises a convex mirror and a concave mirror. In embodiments, the primary mirror has a center, and the orifice is offset from the center.

Numerous benefits are achieved by way of these apparatuses over conventional apparatuses. Benefits provided by the present invention include wider FOV than conventional space-based telescopes. Having a wider FOV saves time and cost associated with observing the Earth from space. Additionally, the plurality of mirrors are arranged to have an overall compact footprint. Having a compact footprint maximizes available space for other necessary payloads. Additionally, having a compact footprint saves cost associated with delivering the telescope into outer space.

These and other details of embodiments along with many of their advantages and features are described in the following description, claims, and figures.

DETAILED DESCRIPTION OF SPECIFIC EMBODIMENTS

In the following description, numerous examples and details are set forth in order to provide an understanding of embodiments of the present invention. It will be evident to one skilled in the art, however, that certain embodiments can be practiced without some of these details, or can be practiced with modifications or equivalents thereof.

Embodiments of the present invention provide systems and methods for a wide FOV space-based telescope. The space-based telescope may be formed of a plurality of mirrors, which may include a set of extended field corrector optics. The extended field corrector optics may be positioned along an optical path to increase the FOV of the space-based telescope system.

Figure 1:
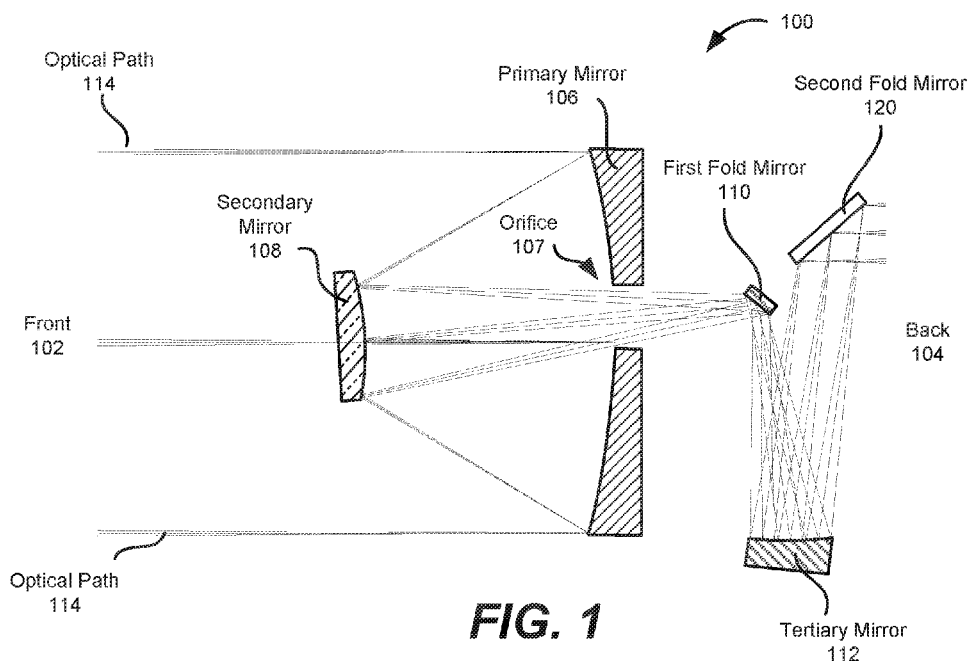
FIG. 1 is a diagram illustrating an afocal telescope mirror arrangement.

FIG. 1 illustrates a telescope 100. The telescope 100 includes a front 102 and a back 104. The front 102 may be directed toward an object (not shown) from which an optical path 114 originates. Telescope 100 also includes a primary mirror 106 having an orifice 107. A secondary mirror 108 is positioned adjacent to the primary mirror 106. The secondary mirror 108 is positioned along the optical path to reflect light incident from the primary mirror 106. Reflected light from the secondary mirror 108 passes through the orifice 107 and projects onto a first fold mirror 110. The first fold mirror 110 directs light toward a tertiary mirror 112, which then reflects the light toward a second fold mirror 120 and additional optics as needed to form an image on a detector (not shown). The first fold mirror 110 and second fold mirror 120 are plain, flat mirrors that do not affect the image quality achieved by the telescope 100.

As shown in FIG. 1, the first fold mirror 110, second fold mirror 120, and the tertiary mirror 112 are positioned laterally adjacent to the primary mirror 106. The first fold mirror 110, second fold mirror 120, and the tertiary mirror 112 fit within the footprint of the primary mirror 106. Accordingly, the telescope 100 may be amenable to space-based use because of the small footprint achieved by fitting the first fold mirror 110, second fold mirror 120, and the tertiary mirror 112 within the boundaries of the primary mirror 106.

Table 1 below illustrates the performance of telescope 100. Specifically, Table 1 shows the percent of the collected energy ensquared within a 6.25 μm pixel for the telescope 100 across a horizontal FOV ranging from −1.25 degrees to 1.25 degrees, and a vertical FOV ranging from −0.4 to 0.4 degrees. The wavelength (λ) of the incident light is between 500 to 700 nm, and the diffraction limit is 71.

TABLE 1

| | | Horizontal FOV | | | | | | | |
|---|---|---|---|---|---|---|---|---|---|
| | | −1.25 | −0.93 | −0.62 | −0.31 | 0 | 0.31 | 0.62 | 0.93 | 1.25 |
| vertical FOV | 0.4 | 5 | 21 | 62 | 57 | 59 | 57 | 62 | 21 | 5 |
| | 0 | 5 | 31 | 65 | 55 | 61 | 55 | 65 | 31 | 5 |
| | −0.4 | 3 | 21 | 56 | 48 | 46 | 48 | 56 | 21 | 3 |

As shown, the telescope 100 achieves energy capture of greater than 40 percent within a horizontal FOV between −0.62 and 0.62. Maximum performance of 61 percent energy capture is achieved at center. The performance of the telescope 100 decreases as the horizontal FOV reaches to plus or minus 0.93 degrees, and decreases even more as the horizontal FOV reaches plus or minus 1.25 degrees. Thus, telescope 100 achieves a FOV of 0.62 degrees in the horizontal direction. With respect to the vertical FOV, performance slightly decreases between −0.4 and 0.4 degrees, where 59 and 46 percent energy capture is achieved at 0.4 and −0.4 degrees, respectively.

According to embodiments of the present invention, telescope performance across horizontal and vertical FOVs are significantly increased when a field corrector assembly, such as a set of extended field corrector optics, is incorporated into the design, as will be discussed in relation to FIG. 2.

Figure 2:
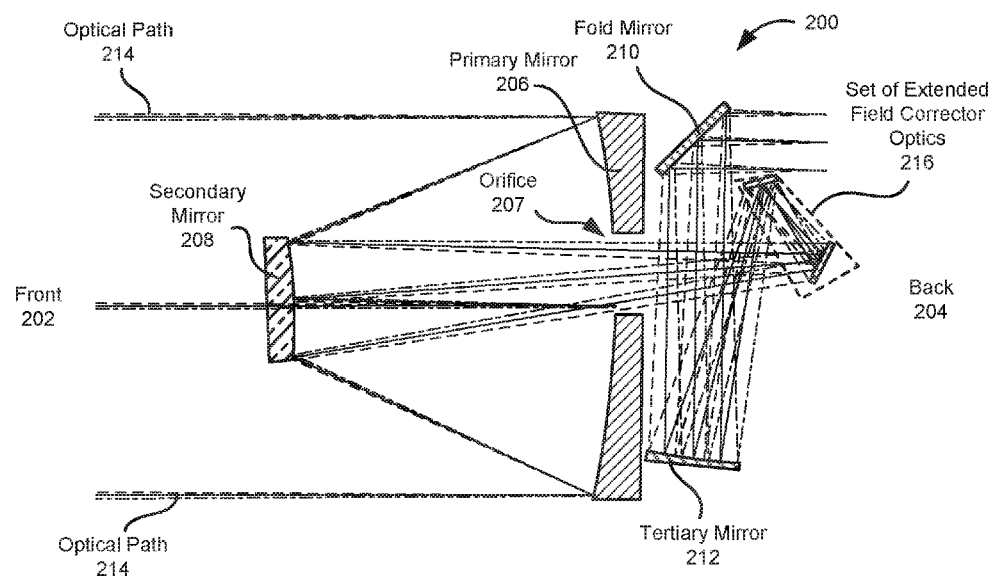
FIG. 2 is a diagram illustrating an afocal telescope mirror arrangement having extended field corrector optics, in accordance with an embodiment of the present invention.

FIG. 2 is a diagram illustrating an afocal telescope mirror arrangement having extended field corrector optics, in accordance with an embodiment of the present invention. As illustrated in FIG. 2, a telescopic arrangement producing collimated output after reflection from fold mirror 210 is provided. Some embodiments can be utilized over a range of magnifications, for example, between 3× and 12× although embodiments are not limited to this particular range. FIG. 2 illustrates telescope 200 having a plurality of mirrors that include a primary mirror 206 having an orifice 207. The primary mirror 206 may have a radial center, and the orifice 207 may be positioned offset from that center. An optical path 214 originating from an object (not shown) located at the front 202 of the telescope 200 may project toward the telescope 200. Light projected along the optical path 214 may reflect off the primary mirror 206, reflect off the secondary mirror 208, and then travel through the orifice 207.

According to an embodiment of the present invention, a set of extended field corrector optics 216 is positioned along the optical path 214 to receive at least a portion of light incident from the secondary mirror 208. In some embodiments, all of the light reflected by the secondary mirror 208 is received at the set of extended field corrector optics 216. The set of extended field corrector optics may enable the telescope 200 to have a wider field of view (FOV). In embodiments, the set of extended field corrector optics 216 is positioned adjacent to the primary mirror 206 on a side opposite of the secondary mirror 208. For instance, the set of extended field corrector optics 216 may be positioned adjacent to a side of the primary mirror 206 that is facing toward the back 204 of the telescope 200. In an embodiment, at least a portion of the extended field corrector optics may be positioned along a center axis of the orifice 207. The set of extended field corrector optics 216 may include a pair of mirrors, as will be discussed in greater detail further herein with respect to FIG. 3A.

In embodiments, a tertiary mirror 212 is positioned along the optical path to receive at least a portion (or all) of light incident from the set of extended field corrector optics 216. The tertiary mirror 212 may be positioned adjacent to the extended field corrector optics 216. In an embodiment, the tertiary mirror 212 is positioned below the set of extended field corrector optics 216 and adjacent to an edge of the primary mirror 206. In some embodiments, the tertiary mirror 212 is curved such that the tertiary mirror 212 has an optical power suitable to collimate light received from the set of extended field corrector optics.

As shown in FIG. 2, light incident from the set of extended field corrector optics may propagate in a direction toward the primary mirror 206 after passing through the set of extended field corrector optics. Accordingly, tertiary mirror 212 may be positioned to receive light incident from the set of extended field corrector optics that is propagating toward the primary mirror. Thus, rays are folded back towards the primary mirror after passing through the set of extended field corrector optics, resulting in a compact design as discussed herein.

For instance, tertiary mirror 212 may be positioned adjacent to primary mirror 206, with the tertiary mirror closer to the back of the primary mirror than the set of extended field corrector optics. Thus, light reflected off of tertiary mirror 212 may propagate in a space disposed between primary mirror 206 and the set of extended field corrector optics 216 as it propagates toward fold mirror 210. In some implementations, the rays propagating between the tertiary mirror and the fold mirror are substantially parallel to the back of the primary mirror. Comparing the telescopes illustrated in FIGS. 1 and 2, the tertiary mirror is used on opposite sides of the optical axis of the tertiary mirror in FIG. 2 compared to FIG. 1. Thus, embodiments of the present invention provide compact designs suitable for space-based and other applications. Accordingly, some embodiments may be referred to as a compact extended field telescope.

A fold mirror 210 may be positioned along the optical path to receive at least a portion of light incident from the tertiary mirror 212. In an embodiment, the fold mirror 210 is positioned adjacent to the extended field corrector optics 216. The fold mirror 210 may be positioned on a side of the set of extended field corrector optics 216 opposite the tertiary mirror 212. As illustrated in the side view of FIG. 2, the tertiary mirror is positioned below the set of extended field corrector optics and the fold mirror is positioned above the set of extended field corrector optics such that the fold mirror and the tertiary mirror are on opposite sides of the centrally located set of extended field corrector optics. Light incident from the tertiary mirror 212 may reflect off the fold mirror 210 and project toward additional optics imaging onto a detector (not shown). The first fold mirror 110 may be a plain, flat mirror that does not affect the image quality achieved by the telescope 200.

Figure 3A:
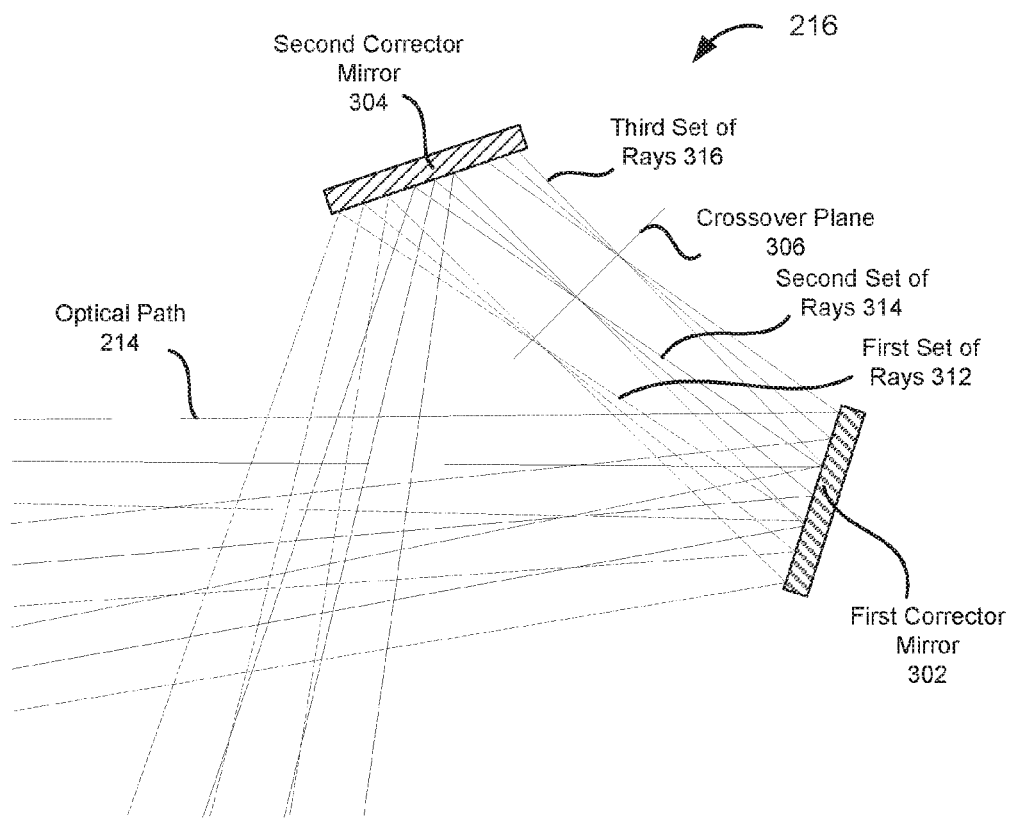
FIG. 3A is a diagram illustrating extended field corrector optics, in accordance with an embodiment of the present invention.
Figure 3B:
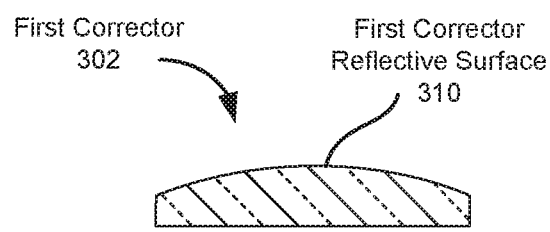
FIG. 3B is a diagram illustrating a first corrector mirror, in accordance with an embodiment of the present invention.
Figure 3C:
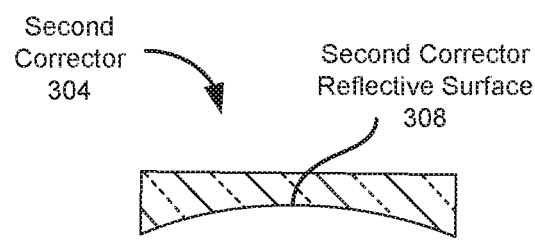
FIG. 3C is a diagram illustrating a second corrector mirror, in accordance with an embodiment of the present invention.

FIGS. 3A-3C illustrate, in more detail, the set of extended field corrector optics 216 according to an embodiment of the present invention. More specifically, FIG. 3A is a diagram illustrating extended field corrector optics, in accordance with an embodiment of the present invention. FIG. 3B is a diagram illustrating a first corrector mirror, in accordance with an embodiment of the present invention. FIG. 3C is a diagram illustrating a second corrector mirror, in accordance with an embodiment of the present invention. Thus, FIGS. 3B and 3C illustrate profiles of mirrors that form the set of extended field corrector optics according to an embodiment of the present invention.

As shown in FIG. 3A, the set of extended field corrector optics 216 may be formed of two corrector mirrors: a first corrector mirror 302, and a second corrector mirror 304. The first corrector mirror 302 may be positioned to reflect light toward the second corrector mirror 304. For instance, the first corrector mirror 302 may be positioned along the optical path 214 to receive light incident from the secondary mirror 208 and reflect the light toward the second corrector mirror 304. In an embodiment, the first and second corrector mirrors 302 and 304 are optically centered. For instance, light reflecting off a rotationally symmetric center of the first corrector mirror 302 is received by a rotationally symmetric center of the second corrector 304.

According to embodiments of the present invention, light rays that propagate along the optical path 214 cross over one another at a crossover plane 306. For instance, the optical path 214 may be composed of three sets of light rays: a first set of light rays 312, a second set of light rays 314, and a third set of light rays 316. Each set of light rays 312, 314, and 316 may be composed of individual light rays that intersect one another at the crossover plane 306. In embodiments, the crossover plane 306 is disposed substantially equidistant between the first and second corrector mirrors 302 and 304. Alternatively, crossover plane 306 may be disposed slightly closer to the second corrector mirror 304. In another alternative, crossover plane 306 may be disposed slightly closer to the first corrector mirror 302. Crossover plane 306 may represent a point in the optical path 214 where an intermediate image plane is formed and may be referred to as an intermediate plane. In an embodiment, the crossover/intermediate image plane is an accessible crossover/intermediate plane. In some embodiments, a field stop can be placed at the crossover plane 306 to limit the field of view of the telescope 200. In other embodiments, because the crossover plane is accessible and configured to receive optics placed at the crossover plane, other optical elements can be placed at the crossover plane to perform other suitable optical functions. One of ordinary skill in the art would recognize many variations, modifications, and alternatives.

In embodiments, the first and second corrector mirrors 302 and 304 are configured to achieve little to no net paraxial optical power for the telescope 200, i.e., substantially no net paraxial optical power. In an embodiment, the set of extended field corrector optics 216 has a paraxial optical power less than 1% of the optical power of the telescope 200. In other embodiments, the paraxial optical power of the set of extended field corrector optics is less than 0.8%, 06%, 0.4%, or 0.2% of the optical power of the telescope 200. As an example, the first corrector mirror 302 may have light reflecting properties that are opposite to the light reflecting properties of the second corrector mirror 302. For instance, the first corrector mirror 302 may be a convex mirror, as illustrated in FIG. 3B, and the second corrector mirror 304 may be a concave mirror, as illustrated in FIG. 3C. In some embodiments, the first and second corrector mirrors 302 and 304 may be configured to provide additional paraxial optical power to the design.

The first and second corrector mirrors 302 and 304 may have a first corrector reflective surface 310 and a second corrector reflective surface 308, respectively, both of which may operate as the light reflecting surface. In an embodiment, the first corrector reflective surface 310 and the second corrector reflective surface 308 are disposed toward the crossover plane 306. In embodiments, the first and second corrector mirrors 302 and 304 are each rotationally symmetrical about a center location, which may not be the physical center of the mirrors 302 and 304. Although FIG. 3A illustrates the first corrector mirror 302 as the convex mirror and the second corrector mirror 304 as the concave mirror, embodiments where the first corrector mirror 302 is concave and the second corrector mirror 304 is convex are envisioned in alternative embodiments herein as well.

Figure 4:
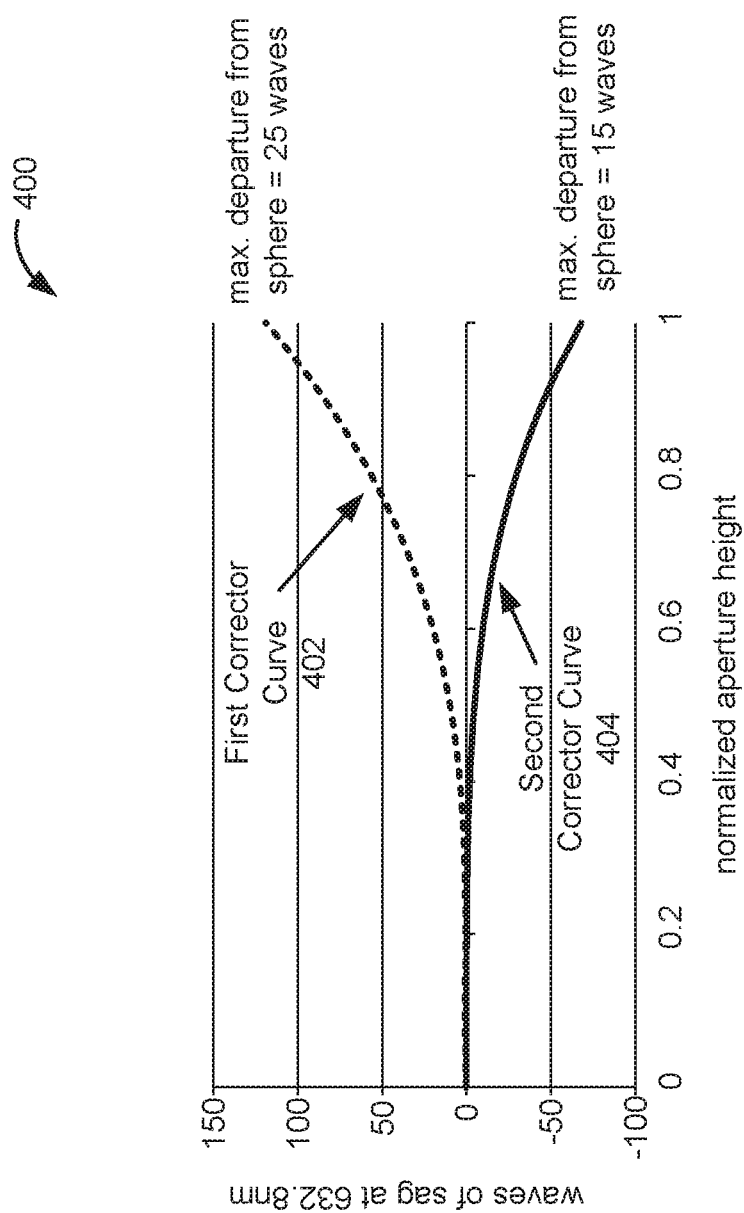
FIG. 4 is a graph illustrating aspherical profiles of corrector mirrors, in accordance with an embodiment of the present invention.

In an embodiment, the first and second corrector mirrors 302 and 304 are aspherical mirrors. Their deviation from a sphere may be minor, as shown in FIG. 4, which illustrates a graphical representation of the curvature of the first and second corrector mirrors 302 and 304. The graph of FIG. 4 has a vertical axis representing waves of sag at 632.8 nm, and a horizontal axis representing normalized aperture height where 0 represents the center of the mirror, and 1 represents the edge of the mirror. A first corrector curve 402 represents the mirror profile of the first corrector mirror 302, and the second corrector curve 404 represents the mirror profile of the second corrector mirror 304. In an embodiment, the first corrector mirror 302 may be more aspherical than the second corrector mirror 304. For instance, the first corrector mirror 302 may deviate from a spherical profile by at most 25 waves, whereas the second corrector mirror 304 may deviate from a spherical profile by at most 15 waves.

Figure 5A:
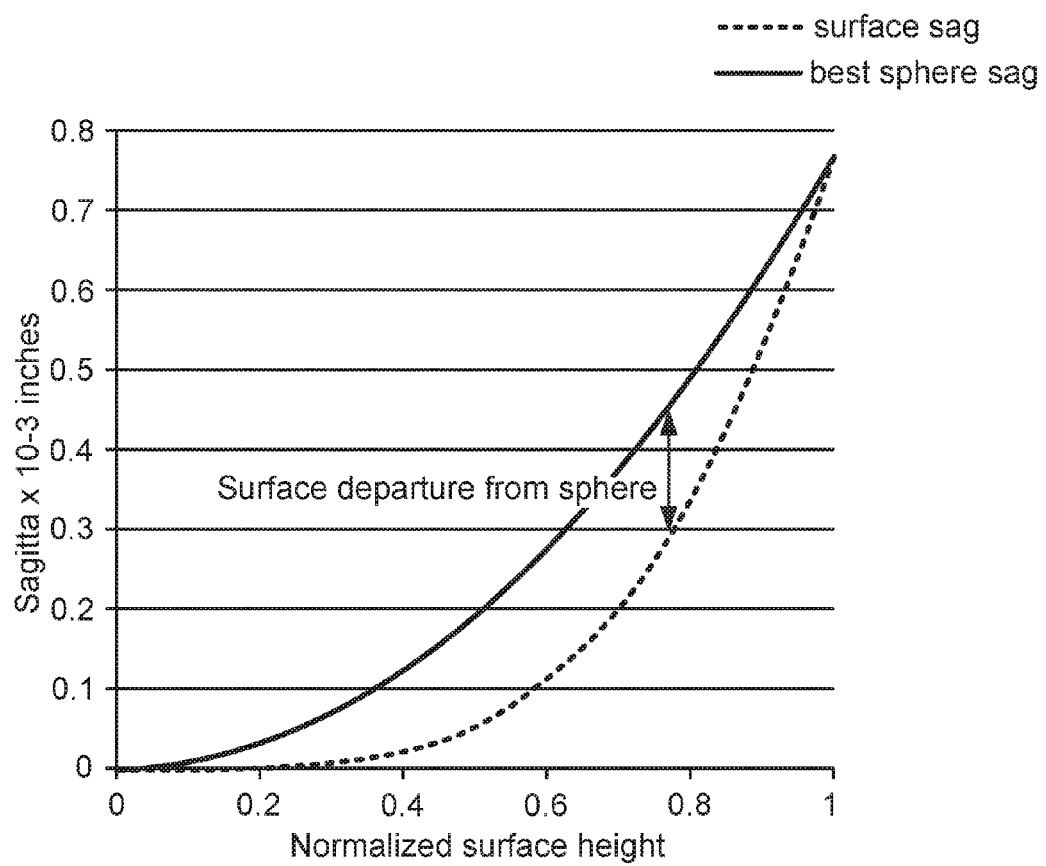
FIG. 5A is a simplified plot illustrating a surface profile of the first corrector mirror, in accordance with an embodiment of the present invention.

FIG. 5A is a simplified plot illustrating a surface profile of the first corrector mirror according to an embodiment of the present invention. As illustrated in FIG. 5A, the surface profile of the mirror varies from a spherical profile by a few fractions of a mil (thousandth of an inch). Referring to FIG. 5A, the surface profile has a sagitta that departs from a sphere as a function of the normalized surface height. Although characterized by a spherical sag at the edges of the mirror, the surface profile has less sag than a spherical mirror, with a maximum departure for a spherical surface of about $0.2 \times 10^{-3}$ inches near the location about half the normalized surface height. As discussed above, the actual shape of the curve defining the departure from a spherical mirror will depend on the surface profile of the second corrector mirror. One of ordinary skill in the art would recognize many variations, modifications, and alternatives.

Figure 5B:
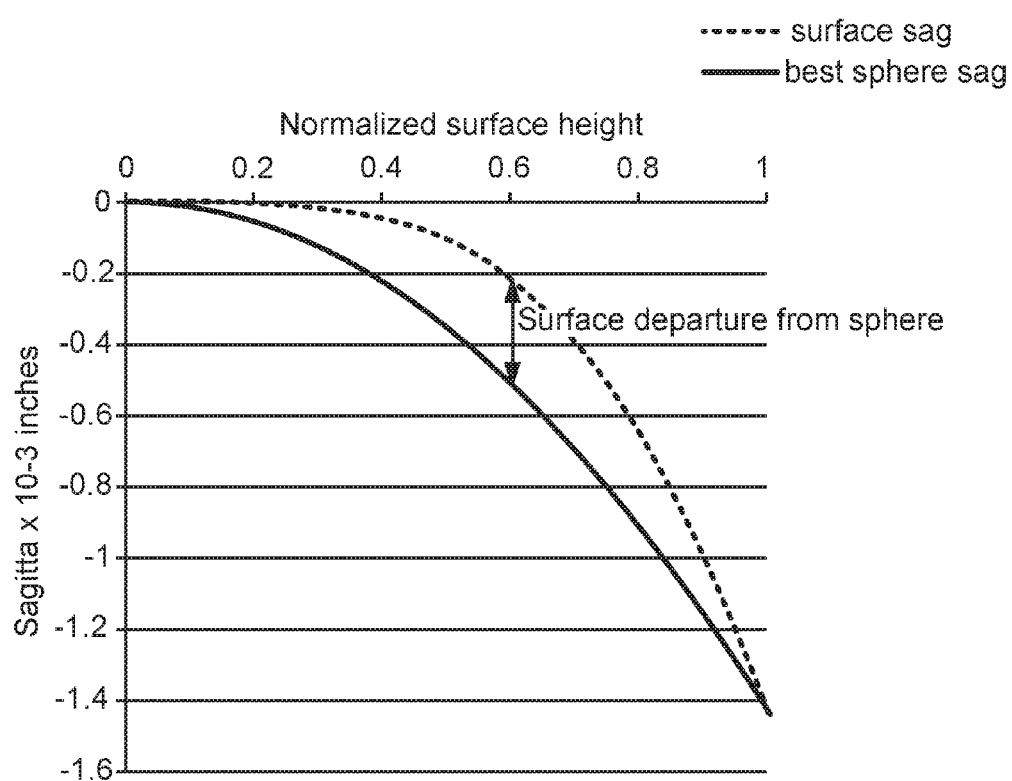
FIG. 5B is a simplified plot illustrating a surface profile of the second corrector mirror, in accordance with an embodiment of the present invention.

FIG. 5B is a simplified plot illustrating a surface profile of the second corrector mirror according to an embodiment of the present invention. As illustrated in FIG. 5B, the surface profile of the mirror varies from a spherical profile by a few fractions of a mil (thousandth of an inch). Referring to FIG. 5B, the surface profile has a sagitta that departs from a sphere as a function of the normalized surface height. Although characterized by a spherical sag at the edges of the mirror, the surface profile has less sag than a spherical mirror (measured in terms of negative sag), with a maximum departure for a spherical surface of about $0.3 \times 10^{-3}$ inches near the location of about half the normalized surface height. As discussed above, the actual shape of the curve defining the departure from a spherical mirror will depend on the surface profile of the first corrector mirror. One of ordinary skill in the art would recognize many variations, modifications, and alternatives.

Table 2 below illustrates the performance of a telescope according to an embodiment of the present invention. Specifically, Table 2 shows the percent of collected energy captured within a 6.25 μm pixel for the telescope 200 across a horizontal FOV ranging from −1.25 degrees to 1.25 degrees, and a vertical FOV ranging from −0.4 to 0.4 degrees. The wavelength (λ) of the incident light is between 500 to 700 nm, and the diffraction limit is 71. It is to be appreciated that the configuration of Table 2 is arranged such that it is similar to the configuration of Table 1 for ease of comparison.

TABLE 2

| | | Horizontal FOV | | | | | | | | |
|---|---|---|---|---|---|---|---|---|---|---|
| | | −1.25 | −0.93 | −0.62 | −0.31 | 0 | 0.31 | 0.62 | 0.93 | 1.25 |
| vertical FOV | 0.4 | 44 | 66 | 63 | 65 | 67 | 65 | 63 | 66 | 44 |
| | 0 | 64 | 61 | 62 | 67 | 70 | 67 | 62 | 61 | 64 |
| | −0.4 | 57 | 61 | 63 | 64 | 65 | 64 | 63 | 61 | 57 |

As shown, telescope 200, according to embodiments of the present invention, achieves energy capture of greater than 40 percent within a horizontal FOV between −1.25 and 1.25. Maximum performance of 70 percent energy capture is achieved at center. The performance of the telescope 200 does not significantly decrease as the horizontal FOV reaches to plus or minus 0.93 degrees, nor does it decrease below 40 percent as the horizontal FOV reaches plus or minus 1.25 degrees. Thus, telescope 200 according to embodiments of the present invention, can achieve a FOV of 1.25 degrees in the horizontal direction, which is substantially greater than the FOV of 0.62 degrees of telescopes 100. With respect to the vertical FOV, performance slightly decreases between −0.4 and 0.4 degrees, where 67 and 65 percent energy capture is achieved at 0.4 and −0.4 degrees, respectively, which is still greater than 59 and 46 percent energy capture at 0.4 and −0.4 degrees, respectively, for telescopes 100.

Tables 3 and 4 below further illustrate the performance of a telescope according to embodiments of the present invention. Table 3 shows the percent of collected energy captured within a 2.45 μm pixel for the telescope 200 in the visible band with a 500 mm focal length perfect imager across a horizontal FOV ranging from −1.25 degrees to 1.25 degrees, and a vertical FOV ranging from −0.5 to 0.5 degrees. The diffraction limit is 26.

TABLE 3

| | | \multicolumn{9}{c}{Horizontal FOV} | | | | | | | | |
|---|---|---|---|---|---|---|---|---|---|---|
| | | −1.25 | −0.93 | −0.62 | −0.31 | 0 | 0.31 | 0.62 | 0.93 | 1.25 |
| vertical FOV | 0.5 | 13 | 25 | 25 | 25 | 25 | 25 | 25 | 25 | 13 |
| | 0 | 25 | 24 | 25 | 25 | 25 | 25 | 25 | 24 | 25 |
| | −0.5 | 22 | 22 | 25 | 25 | 25 | 25 | 25 | 22 | 22 |

Table 4 shows the percent of collected energy captured within a 18 μm pixel for the telescope 200 in the short wave infrared (SWIR) band with a 500 mm focal length perfect imager across a horizontal FOV ranging from −1.25 degrees to 1.25 degrees, and a vertical FOV ranging from −0.5 to 0.5 degrees. The diffraction limit is 80.

TABLE 4

| | | \multicolumn{9}{c}{Horizontal FOV} | | | | | | | | |
|---|---|---|---|---|---|---|---|---|---|---|
| | | −1.25 | −0.93 | −0.62 | −0.31 | 0 | 0.31 | 0.62 | 0.93 | 1.25 |
| vertical FOV | 0.5 | 75 | 80 | 80 | 80 | 80 | 80 | 80 | 80 | 75 |
| | 0 | 79 | 80 | 80 | 80 | 80 | 80 | 80 | 80 | 79 |
| | −0.5 | 79 | 79 | 80 | 80 | 80 | 80 | 80 | 79 | 79 |

As shown in both Tables 3 and 4, maximum energy capture performance for telescope 200 is achieved at center and stays substantially constant across a vast majority of the field of view. The performance of the telescope 200 does not significantly decrease until the very edges of the field of view, e.g., plus and minus 1.25 degrees. As can be determined from Tables 3 and 4, telescope 200 can achieve high energy capture across a wide FOV.

Figure 7A:
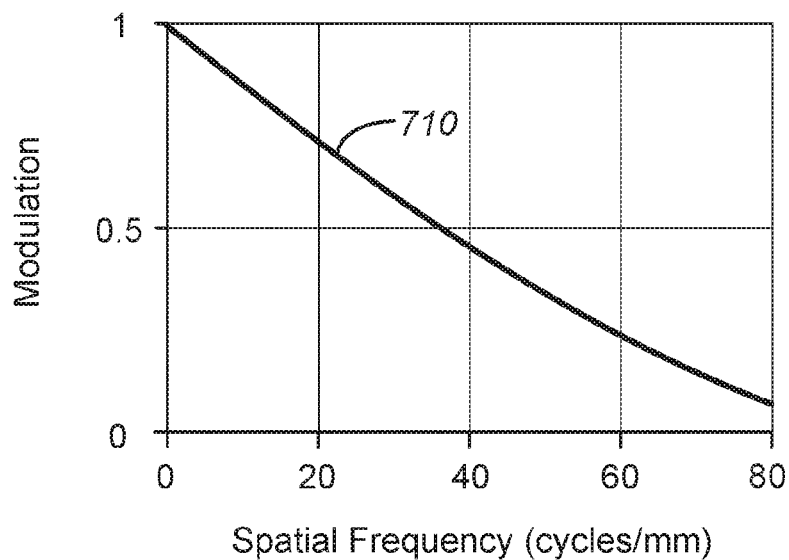
FIG. 7A is a graphical representation of image quality measured in the SWIR band, in accordance with an embodiment of the present invention.
Figure 7B:
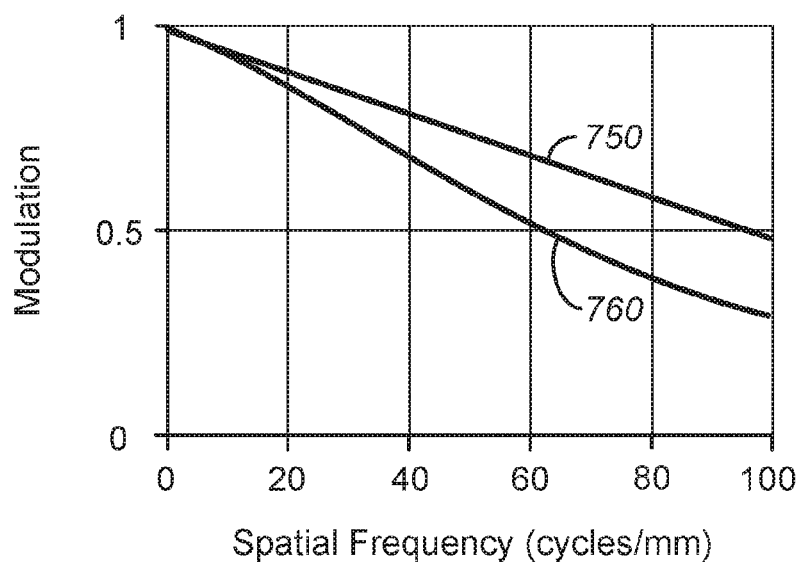
FIG. 7B is a graphical representation of image quality measured in the visible band, in accordance with an embodiment of the present invention.

In addition to Tables 3 and 4, proof of the effectiveness of embodiments of the present invention can also be seen from FIGS. 7A-7B, which illustrate a graphical representation of image quality, as measured by modulation transfer function (MTF), produced by an afocal telescope design, such as the telescope design of telescope 200 discussed herein. The graphs of FIGS. 7A-7B have a vertical axis representing modulation, and a horizontal axis representing spatial frequency in terms of cycles/mm.

FIG. 7A shows the image quality measured in the SWIR band (wavelengths between 1400-1800 nm) wherein plotted curve 710 represents the MTF performance of telescopes according to embodiments of the present invention both at 0 degree FOV and the maximum design FOV. As can be seen from FIG. 7A, modulation is greatest at a spatial frequency of 0 and decreases to approximately 0.1 at a spatial frequency of 80. 0.5 modulation is attained at a spatial frequency of 40.

FIG. 7B shows the image quality measured in the visible band (wavelengths between 500-700 nm) where plotted curve 750 represents the MTF performance of telescopes according to embodiments of the present invention at 0 degree FOV, and plotted curve 760 represents the MTF performance of telescopes according to embodiments of the present invention at the maximum design FOV. As shown in FIG. 7B, modulation for curves 750 and 760 is greatest at a spatial frequency of 0, and decreases to approximately 0.5 and 0.3, respectively at a spatial frequency of 100.

Figure 8A:
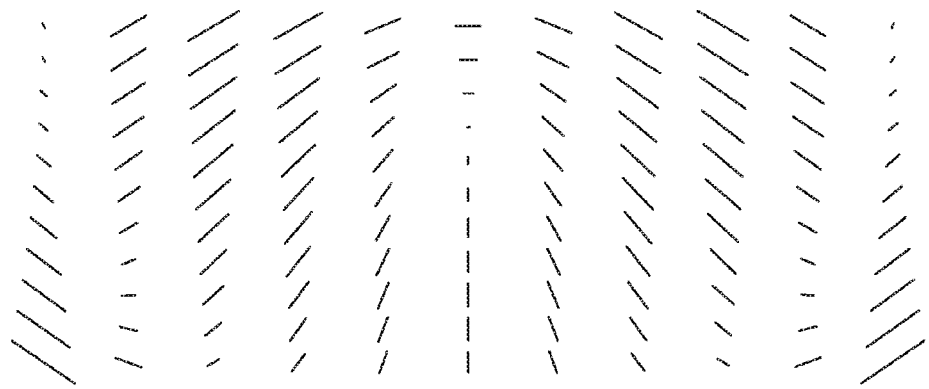
FIG. 8A is a map of astigmatism for an afocal telescope without extended field corrector optics.
Figure 8B:
FIG. 8B is a map of astigmatism for an afocal telescope with extended field corrector optics, in accordance with an embodiment of the present invention.

FIGS. 8A-8B illustrate maps of astigmatism across a FOV for telescopes with and without field corrected designs to show how telescopes with field extended field corrector optics improve over telescopes without extended field corrector optics. Specifically, FIG. 8A illustrates a map of astigmatism across a FOV for a telescope without extended field corrector optics (e.g., telescope 100) and FIG. 8B illustrates a map of astigmatism across a FOV for a telescope with extended field corrector optics (e.g., telescope 200). As can be seen when contrasting FIG. 8A with 8B, the degree of astigmatism, as represented by the lengths of the vector lines, is substantially less than telescopes without extended field corrector optics across a vast majority of the FOV. Less astigmatism results in more accurate and less distorted images that can be captured by the telescope.

Figure 6:
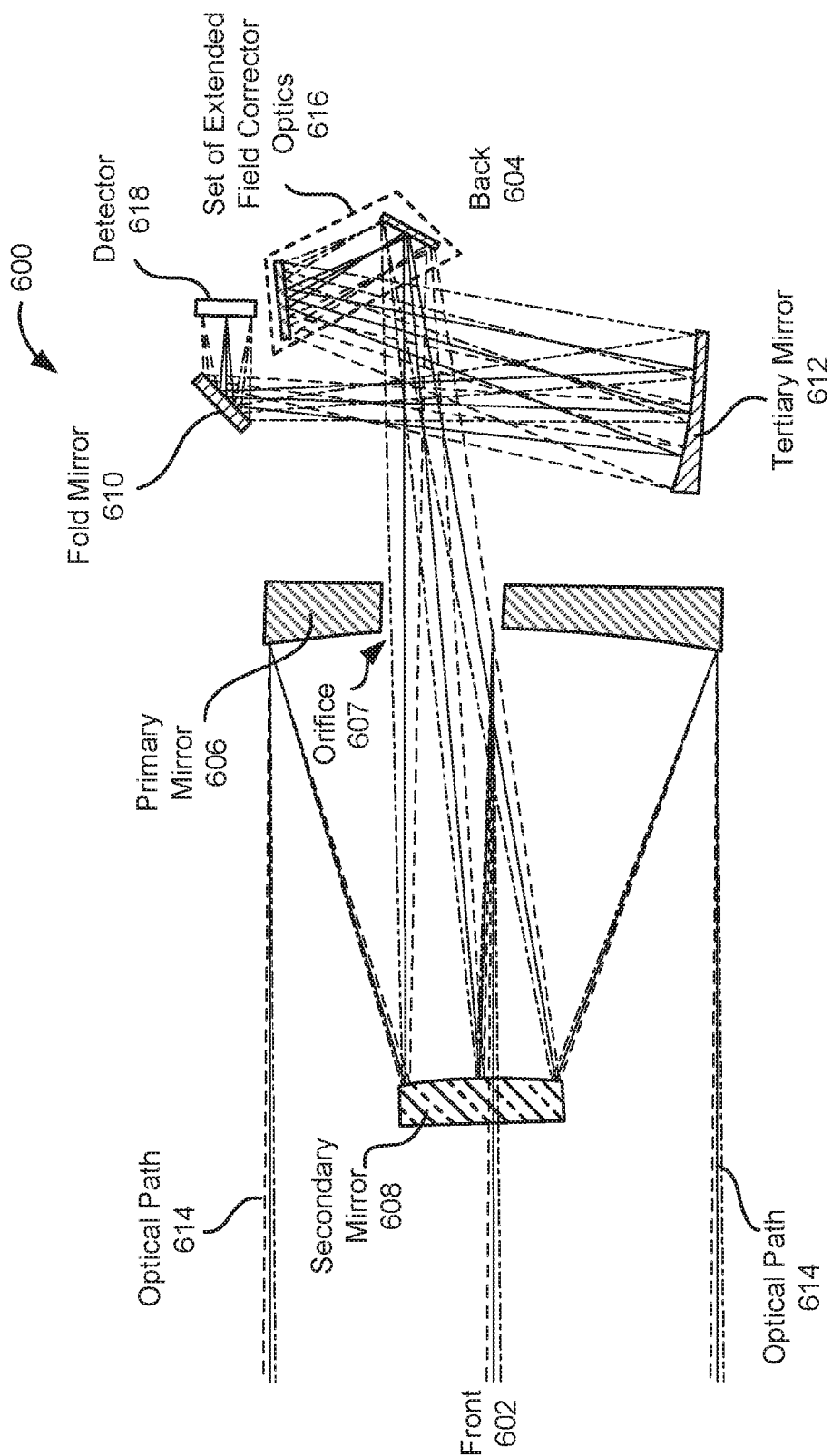
FIG. 6 is a diagram illustrating a focal telescope mirror arrangement having extended field corrector optics, in accordance with an embodiment of the present invention.

FIG. 6 is a diagram illustrating a telescope 600 having a focal telescope mirror arrangement that includes extended field corrector optics in accordance with an embodiment of the present invention. As illustrated in FIG. 6, a reflective telescopic arrangement is provided in which light is focused to an image at the output of fold mirror 610, thereby providing an imaging version in this embodiment. As discussed previously in relation to FIG. 2, some embodiments provide an afocal telescope system that produces collimated (i.e., parallel) light at the output of the system. However, in alternative embodiments as illustrated in FIG. 6, the set of extended field corrector optics 616 can be used for an imaging reflective system instead of a true afocal telescope as discussed in relation to FIG. 2. As shown in FIG. 6, a tertiary mirror 612 having a deeper curvature than that of the tertiary mirror 212 of FIG. 2 may be utilized in the telescope 600. Accordingly, the mirror arrangement would focus light directly and could be used with a detector 618 without the need for additional focusing optics. In some embodiments, additional focusing optics are utilized, for example, by utilizing a fold mirror with optical power. One of ordinary skill in the art would recognize many variations, modifications, and alternatives.

Some similarities are shared with the embodiment illustrated in FIG. 2, including the primary mirror 606, the secondary mirror 608, and the set of extended field corrector optics 616 positioned adjacent to a side of the primary mirror 606 that is facing toward the back 604 of the telescope 600. An optical path 614 originating from an object (not shown) located at the front 602 of the telescope 600 may project toward the telescope 600. As illustrated in FIG. 6, the primary mirror has a center and the orifice 607 can be offset from the center. Because of the focal nature of telescope 600, the optical specifications/prescriptions for the optical elements, including the primary mirror 606, the secondary mirror 608, the tertiary mirror 612, and the first corrector mirror and the second corrector mirror included in the set of extended field corrector optics 616, may differ from the optical specifications for similar elements in telescope 200. Thus, as will be evident to one of skill in the art, in a manner similar to the design of an afocal system as illustrated in FIG. 2, the focal system illustrated in FIG. 6 will utilize optical elements that are modified as needed, particularly the focusing power of tertiary mirror 612, to provide a focal system. One of ordinary skill in the art of optical design will accordingly be able to specify the optical characteristic suitable for either afocal or focal designs.

The tertiary mirror 612 is characterized by a predetermined optical power suitable to form an image at the output, which can be the imaging plane of detector 618. In some embodiments as mentioned above, the fold mirror 610 can have a second predetermined optical power although this is not required by the present invention. As discussed in relation to FIG. 2, the set of extended field corrector optics 616 can have substantially no net optical power. In other embodiments, the combination of tertiary mirror 612, extended field corrector optics 616, and/or the fold mirror 610 provide the optical power to focus the image, for example, at detector 618.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A telescope comprising:
    a primary mirror having an orifice, wherein an optical path originates from an object positioned in front of the primary mirror and reflects off the primary mirror;
    a secondary mirror disposed adjacent to the primary mirror, wherein light propagating along the optical path reflects off the secondary mirror and passes through the orifice in the primary mirror;
    a set of extended field corrector optics disposed along the optical path, the set of extended field corrector optics positioned to reflect light incident from the secondary mirror, wherein the set of extended field corrector optics comprises a convex mirror and a concave mirror, wherein the set of extended field corrector optics has substantially no net paraxial optical power; and
    a tertiary mirror disposed along the optical path and adjacent to the set of extended field corrector optics, the tertiary mirror positioned to reflect the light incident from the set of extended field corrector optics.

2. The telescope of claim 1 further comprising a fold mirror disposed along the optical path and adjacent to the set of extended field corrector optics, the fold mirror positioned to reflect light propagating along an optical path from the tertiary mirror.

3. The telescope of claim 1 wherein the convex mirror and the concave mirror are disposed on opposite sides of an intermediate image.

4. The telescope of claim 3 wherein the intermediate image is disposed equal distances away from the convex mirror and the concave mirror.

5. The telescope of claim 3 wherein the intermediate image is an accessible intermediate image.

6. The telescope of claim 1 wherein the convex mirror and the concave mirror are both aspheric.

7. The telescope of claim 6 wherein the convex mirror is more aspheric than the concave mirror.

8. A method of correcting an optical field, the method comprising:
    reflecting, by a primary mirror, a light originating from an object toward a secondary mirror, thereby creating an intermediate image,
    reflecting, by the secondary mirror, the light from the primary mirror toward a set of extended field corrector optics, wherein the light passes through an orifice in the primary mirror;
    reflecting, by the set of extended field corrector optics, the light twice from the secondary mirror toward a tertiary mirror; and
    reflecting, by the tertiary mirror, the light from the set of extended field corrector optics toward a fold mirror.

9. The method of claim 8 wherein the set of extended field corrector optics comprises a convex mirror and a concave mirror.

10. The method of claim 9 wherein the convex mirror and the concave mirror are disposed on opposite sides of the intermediate image.

11. The method of claim 8 wherein the set of extended field corrector optics has substantially no net paraxial optical power.

12. A telescope system comprising:
a plurality of mirrors comprising:
  a primary mirror having an orifice, wherein an optical path originates from an object positioned in front of the primary mirror and reflects off the primary mirror;
  a secondary mirror disposed adjacent to the primary mirror, wherein light propagating along the optical path reflects off the secondary mirror and passes through the orifice in the primary mirror;
  a set of extended field corrector optics disposed along the optical path, the set of extended field corrector optics positioned to reflect light incident from the secondary mirror, wherein the set of extended field corrector optics comprises a convex mirror and a concave mirror, wherein the set of extended field corrector optics has substantially no net paraxial optical power; and
  a tertiary mirror disposed along the optical path and adjacent to the set of extended field corrector optics, the tertiary mirror positioned to reflect the light incident from the set of extended field corrector optics; and
a detector positioned to receive light incident from the plurality of mirrors.

13. The telescope system of claim 12 wherein the plurality of mirrors further comprises a fold mirror disposed along the optical path and adjacent to the set of extended field corrector optics, the fold mirror positioned to reflect light propagating along an optical path from the tertiary mirror.

14. The telescope system of claim 12 wherein the convex mirror and the concave mirror are disposed on opposite sides of an intermediate image.

15. The telescope system of claim 12 wherein the light incident from the plurality of mirrors received at the detector comprises an image of the object.

16. A telescope comprising:
a primary mirror having an orifice, wherein an optical path originates from an object positioned in front of the primary mirror and reflects off the primary mirror;
a secondary mirror disposed adjacent to the primary mirror, wherein light propagating along the optical path reflects off the secondary mirror and passes through the orifice in the primary mirror;
a set of extended field corrector optics disposed along the optical path, the set of extended field corrector optics positioned to reflect light incident from the secondary mirror, wherein the set of extended field corrector optics comprises an aspheric convex mirror and an aspheric concave mirror, wherein the aspheric convex mirror is more aspheric than the aspheric concave mirror; and
a tertiary mirror disposed along the optical path and adjacent to the set of extended field corrector optics, the tertiary mirror positioned to reflect the light incident from the set of extended field corrector optics.

17. The telescope of claim 16 further comprising a fold mirror disposed along the optical path and adjacent to the set of extended field corrector optics, the fold mirror positioned to reflect an optical path from the tertiary mirror.

18. The telescope of claim 16 wherein the aspheric convex mirror and the aspheric concave mirror are disposed on opposite sides of an intermediate image.

19. The telescope of claim 18 wherein the intermediate image is disposed equal distances away from the aspheric convex mirror and the aspheric concave mirror.

20. The telescope of claim 18 wherein the intermediate image is an accessible intermediate image.

* * * * *